(12) United States Patent
Kapich (10) Patent No.: US 6,502,398 B2
(45) Date of Patent: Jan. 7, 2003

(54) EXHAUST POWER RECOVERY SYSTEM

(76) Inventor: Davorin D. Kapich, 3111 Serrano Dr., Carlsbad, CA (US) 92009

( * ) Notice: Subject to any disclaimer, the term of this patent is extended or adjusted under 35 U.S.C. 154(b) by 0 days.

(21) Appl. No.: 09/761,206

(22) Filed: Jan. 16, 2001

(65) Prior Publication Data

US 2002/0124566 A1 Sep. 12, 2002

(51) Int. Cl.⁷ ............................................... F02B 33/44
(52) U.S. Cl. ............................. 60/608; 60/607; 123/565
(58) Field of Search .................... 60/608, 607; 123/561, 123/565; 417/407

(56) References Cited

U.S. PATENT DOCUMENTS

| | | | | |
|---|---|---|---|---|
| 3,603,079 A | * | 9/1971 | Kickbusch | 60/608 |
| 4,610,235 A | * | 9/1986 | Grunig | 123/565 |
| 4,622,817 A | * | 11/1986 | Kobayashi | 60/608 |
| 4,729,225 A | * | 3/1988 | Bucher | 60/608 |

* cited by examiner

Primary Examiner—Thomas Denion
Assistant Examiner—Thai-Ba Trieu
(74) Attorney, Agent, or Firm—John R. Ross; John R. Ross, III (57) ABSTRACT

An exhaust power recovery system for internal combustion engines. The engine exhaust gases drive a gas turbine that in turn drives a hydraulic turbine pump pressurizing a hydraulic fluid which then in turn is the driving source for a hydraulic motor which transmits power to the engine shaft. In a preferred embodiment for a turbocharged engine, the hydraulic fluid is also used as the drive fluid in a hydraulic supercharger system that provides additional supercharging at low engine speeds to supplement the exhaust driven turbocharging system. In this embodiment the pressurized hydraulic fluid for driving the supercharger hydraulic turbine is provided by a pump driven by the engine shaft. A hydraulic fluid control system is provided to match compressed air flow with engine needs. In this preferred embodiment more than enough energy is recovered from the exhaust gasses by the exhaust power recovery system to operate the hydraulic supercharger system. The horsepower of a 280 horsepower turbocharged diesel engine is increased by about 20 percent to about 335 horsepower. As to fuel efficiency, Applicant estimates that a cross country diesel truck operating 12 hours per day, 300 days per year will save between 6,000 and 10,000 pounds of fuel per year with substantial reductions in emitted pollutants.

8 Claims, 10 Drawing Sheets

FIG. 1

PRIOR ART

PRIOR ART

PRIOR ART

PRIOR ART

EXHAUST POWER RECOVERY SYSTEM

The invention relates to internal combustion engines and particular to such engines with energy recovery systems.

BACKGROUND OF THE INVENTION

Superchargers are air pumps or blowers in the intake system of an internal combustion engine for increasing the mass flow rate of air charge and consequent power output from a given engine size. Turbosuperchargers (normally called turbochargers) are engine exhaust gas turbine driven superchargers. When superchargers are driven mechanically from the shaft of the internal combustion engine, a speed increasing gear box or belt drive is needed. Such superchargers are limited to a relatively low rotating speed and are large in size. Paxon Blowers and Vortech Engineering Co. are marketing such superchargers. Fixed gear ratio superchargers suffer from two very undesirable features: 1) there is a sharp decrease in boost pressure at low engine RPM because boost pressure goes generally to the square of the speed of rotation, and 2) it is generally difficult to disconnect the supercharger from the engine when the supercharger is not needed.

Applicant was granted on Dec. 5, 1995 a patent (U.S. Pat. No. 5,471,965) on a very high-speed radial inflow hydraulic turbine. FIG. 12 of that patent discloses the hydraulic turbine driven blower used in combination with a conventional turbocharger to supercharge an internal combustion engine. In that embodiment the output of the hydraulic driven compressor was input to the compressor of the conventional turbocharger. In all the embodiments shown in the '965 patent, the pump delivering high-pressure hydraulic fluid to the hydraulic turbine was driven directly off the engine shaft. At high speeds when the exhaust driven turbosupercharger is fully capable of supplying sufficient compressed air to the engine, a bypass valve unloaded the hydraulic fluid pump. Other supercharger patents granted to me include U.S. Pat. Nos. 5,937,833, 5,937,832, 5,924,286, and 5,421,310 all of which along with the '965 patent are incorporated herein by reference.

Another hybrid supercharger is disclosed in U.S. Pat. No. 4,285,200 issued to Byrne on Aug. 25, 1981. That patent disclosed a compressor driven by an exhaust driven turbine and a hydraulic driven turbine, the compressor and both turbines being on the same shaft. That turbine was an axial flow turbine and the turbine was driven with engine oil. With this design oil foaming can be a problem. U.S. Pat. No. 5,471,965 and U.S. Pat. No. 4,285,200 are incorporated herein by reference.

There is a great need for improving the efficiency and output power of internal combustion engines, especially diesel engines. In the low RPM range, the currently available turbocharging systems are not very effective in producing sufficient engine manifold pressure and power, required for satisfactory vehicle acceleration and exhaust smoke reduction. This applies especially to "stop and go" type services, such as city buses and trash collecting trucks. It is typical to utilize the energy in engine exhaust gas to supercharge diesel engines; however at high engine speeds the exhaust gas energy is greatly in excess of that which is needed for supercharging and the excess energy is wasted.

What is needed, is an efficient system to put this wasted energy to use.

SUMMARY OF THE INVENTION

The present invention provides an exhaust power recovery system for internal combustion engines. The engine exhaust gases drive a gas turbine that in turn drives a hydraulic turbine pump pressurizing a hydraulic fluid which then in turn is the driving source for a hydraulic motor which transmits power to the engine shaft. In a preferred embodiment for a turbocharged engine, the hydraulic fluid is also used as the drive fluid in a hydraulic supercharger system that provides additional supercharging at low engine speeds to supplement the exhaust driven turbocharging system. In this embodiment the pressurized hydraulic fluid for driving the supercharger hydraulic turbine is provided by a pump driven by the engine shaft. A hydraulic fluid control system is provided to match compressed air flow with engine needs. In this preferred embodiment more than enough energy is recovered from the exhaust gasses by the exhaust power recovery system to operate the hydraulic supercharger system. The horsepower of a 280 horsepower turbocharged diesel engine is increased by about 20 percent to about 335 horsepower. As to fuel efficiency, Applicant estimates that a cross country diesel truck operating 12 hours per day, 300 days per year will save between 6,000 and 10,000 pounds of fuel per year with substantial reductions in emitted pollutants.

DETAILED DESCRIPTION OF PREFERRED EMBODIMENTS

Preferred embodiments of the present invention are described by reference to the drawings.

First Preferred Embodiment

Figure 10:
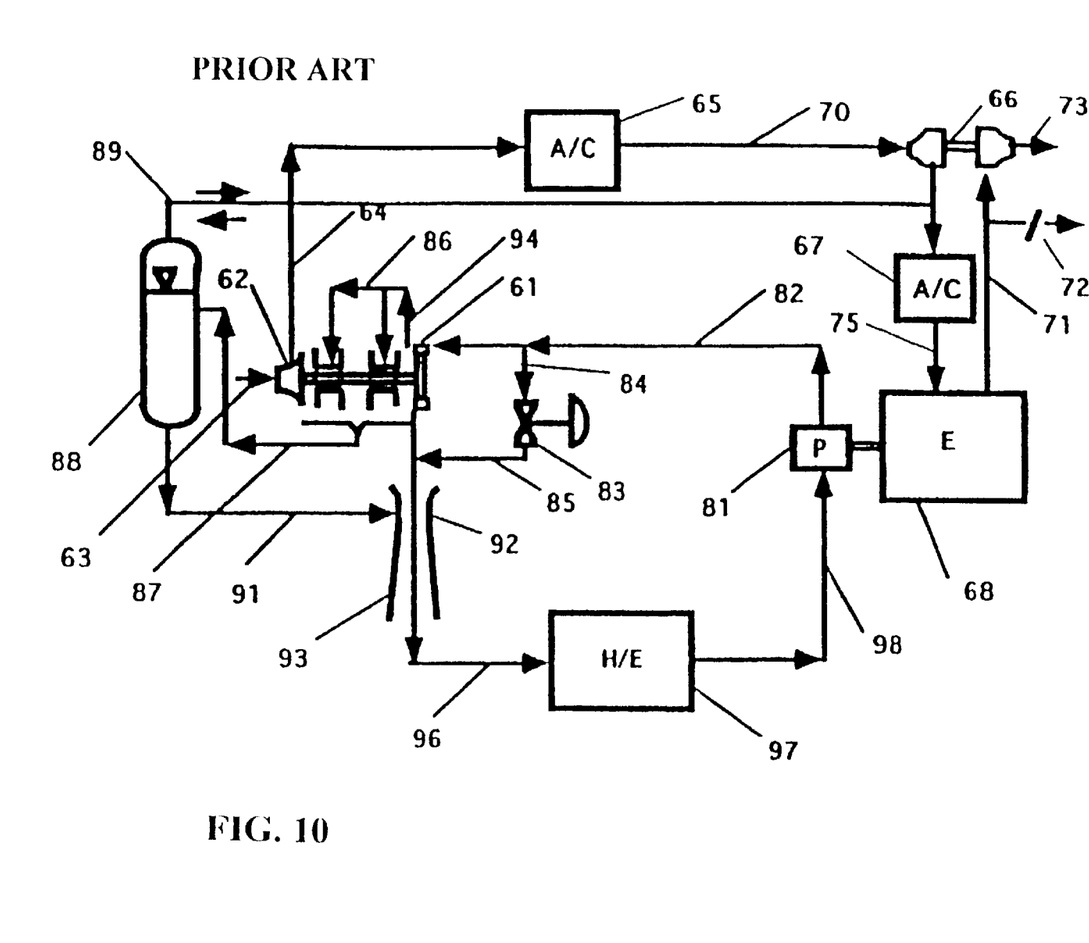
FIG. 10 is prior art FIG. 12 from U.S. Pat. No. 5,471,965 showing a combination hydraulic supercharger exhaust driven turbocharger system for supercharging an internal combustion engine.
Figure 11:
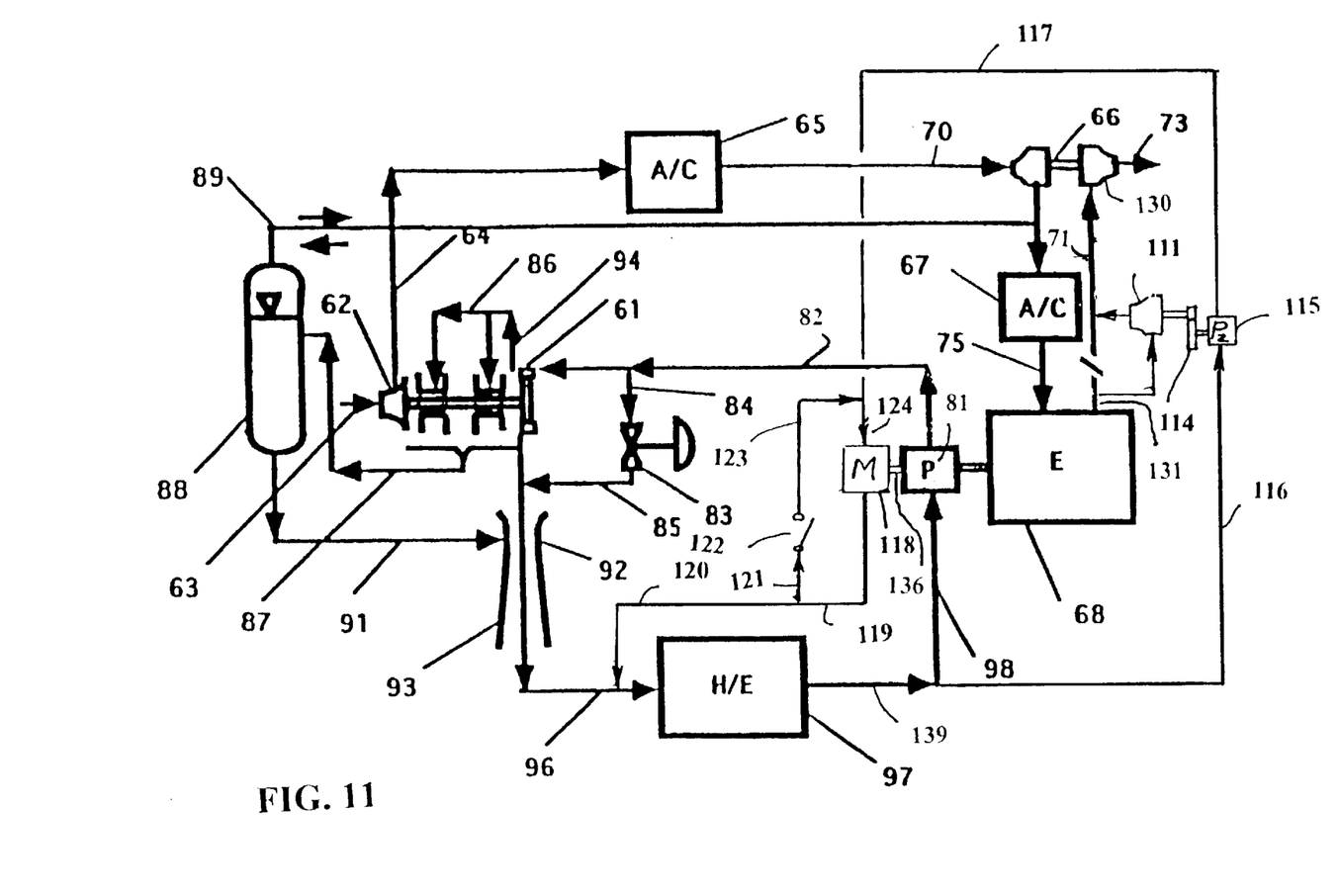
FIG. 11 is a layout showing a first preferred embodiment of the present invention.

A first preferred embodiment is an improved version of the engine system described in U.S. Pat. No. 5,471,965 by reference to FIG. 12 of that patent. This first preferred embodiment is shown in FIG. 11. FIG. 10 in this specification is a copy of the FIG. 12 drawing from the '965 patent. Since this invention is an improvement to my prior art invention covered by the '965 patent, I have included some of the '965 description for completeness.

Supercharger Turbine Drive System

A prior-art supercharger turbine drive is shown in FIGS. 1, 2, 3 and 4, which are extracted from U.S. Pat. No. '965.

Supercharger Turbine Wheel

The supercharger turbine drive, with a wheel of only 0.800-inch diameter, is capable of generating about 10 to 20 HP at about 60,000 to 70,000 RPM, with pressure differentials of about 1400 psi and having the capability of operating at the fluid temperatures of 150 to 250 degrees Fahrenheit.

Figure 1:
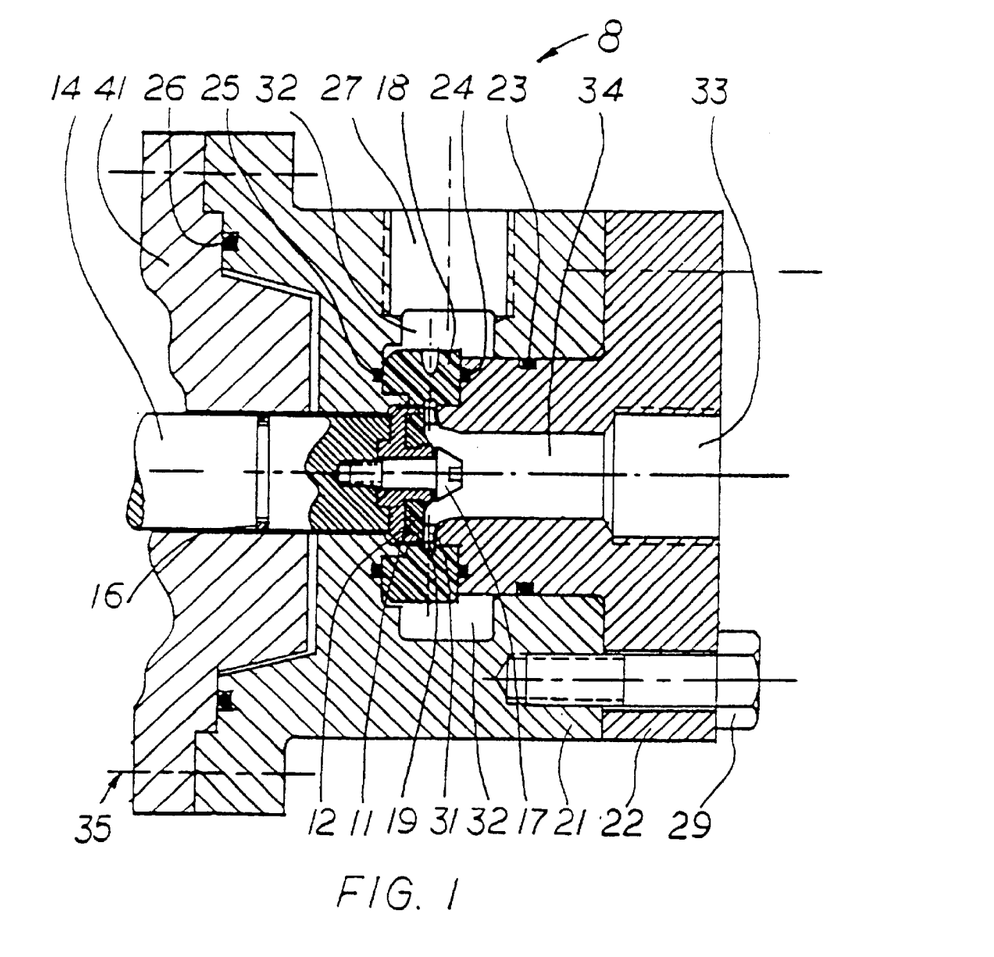
FIG. 1 is a cross sectional drawing showing a preferred embodiment of a very high-speed hydraulic supercharger turbine drive.
Figure 3:
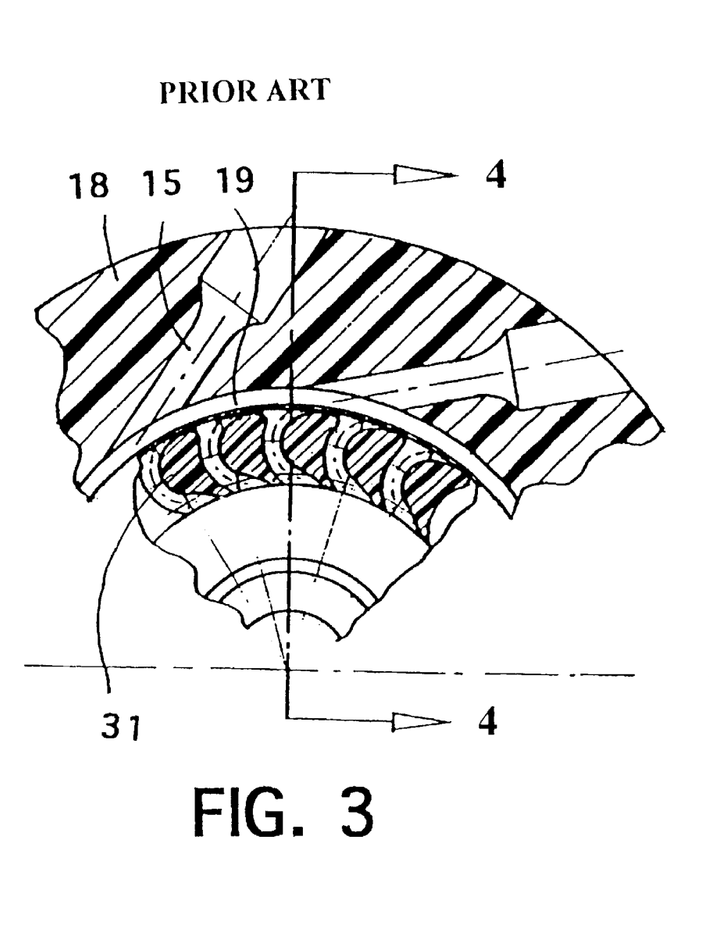
FIGS. 3 and 4 are drawings showing views of the nozzle arrangement of the turbine drive shown in FIG. 1.
Figure 4:
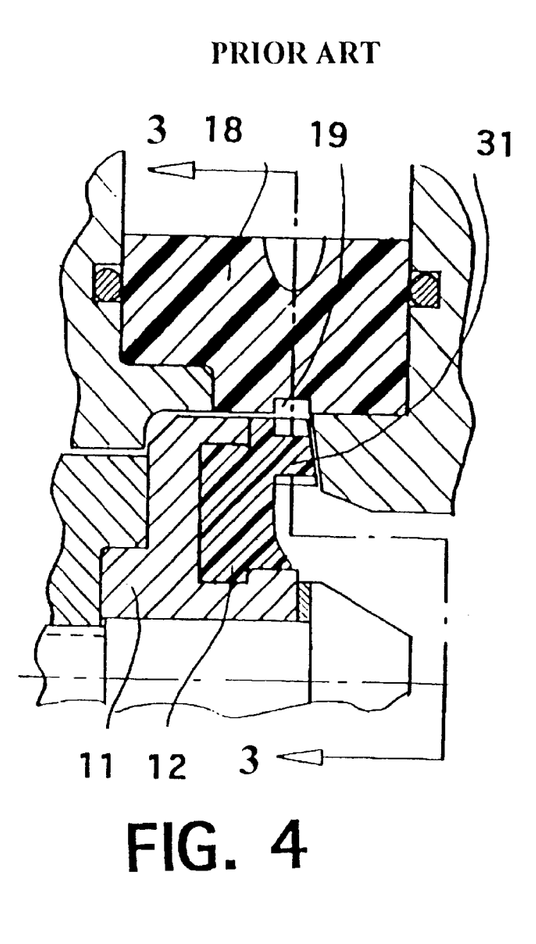
Figure 9:
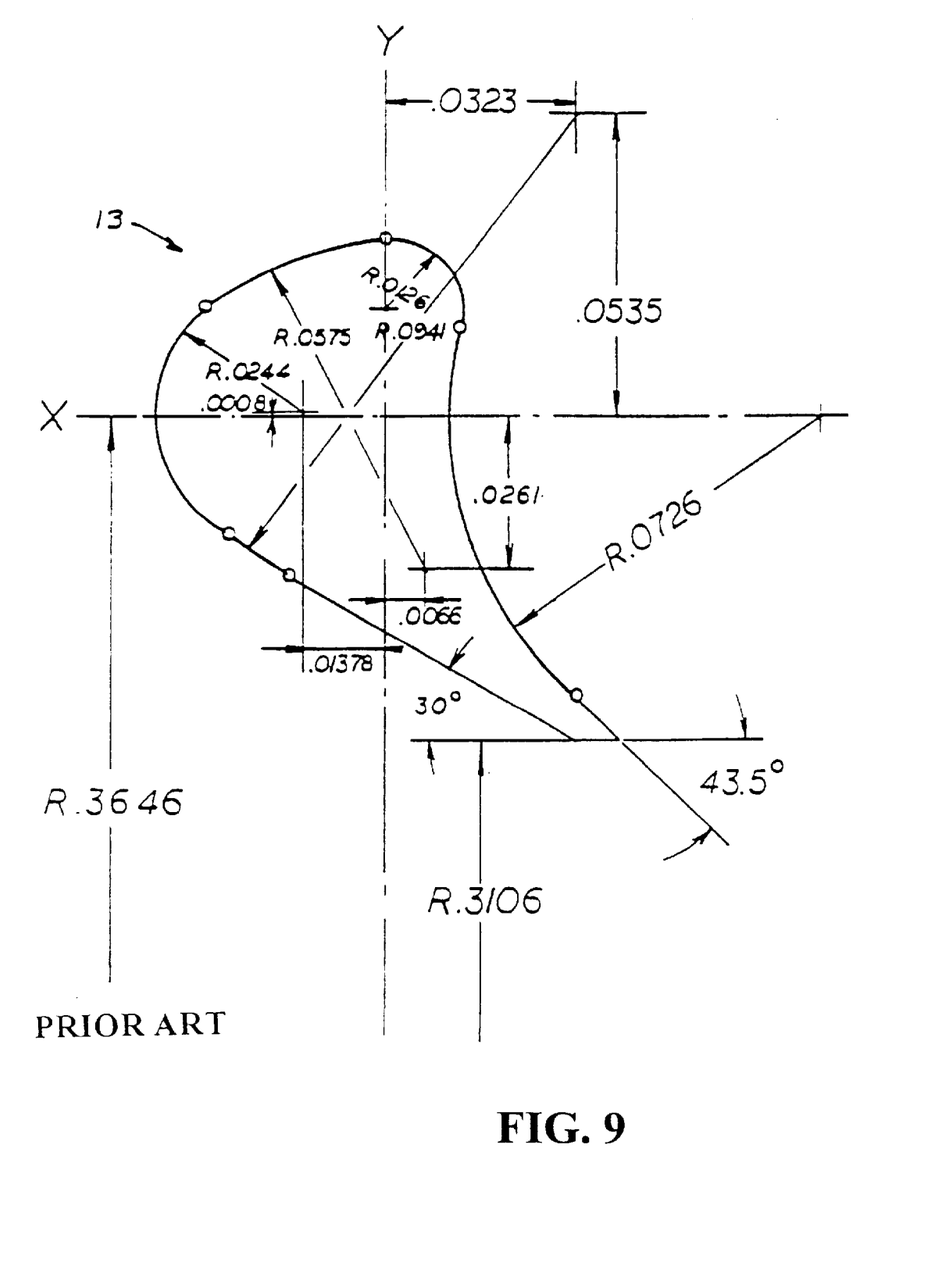
FIG. 9 shows blade dimensions.

Turbine drive 8 includes turbine wheel 11 with 27 turbine blades 31 that are preferably formed in an injection molding process as shown in FIG. 4. The plastic is pressure injected into a mold containing a containing wheel 12 (which is a metal such as steel) forming an integral assembly of plastic turbine wheel 11, metal wheel 12 and plastic turbine blades 31. The metal containing wheel 12 is precisely centered into the turbocharger shaft 14 and held axially by self-locking steel fastener 17 as shown in FIG. 1. Compressive load generated by the self locking steel fastener 17 is sufficient to facilitate the torque transfer from the metal containing wheel 12 into the turbocharger shaft 14 under all anticipated torque loads, fluid temperatures and rotating speeds. During the normal operation the temperature of hydraulic oil is usually in the range of 150 to 250 degrees Fahrenheit which expands the metal containing wheel 12 axially slightly more than the self locking steel fastener 17 and the turbocharger shaft 14, thus increasing the compressive load in the metal containing wheel 12 and the torque transfer capability slightly above the cold assembly condition. The centrifugally and thermally induced stresses in the plastic turbine wheel 11 which is solidly anchored inside the metal containing wheel 12 are to a great extent being absorbed by the metal containing wheel 12. Blade dimensions are shown in FIG. 9. As indicated on FIG. 3 and FIG. 1, the plastic turbine blades 31 are of the radial inflow type with rounded leading edges to minimize the erosion tendency sometime caused by very high hydraulic oil velocity as combined with sharp, thin leading edges. The radial inflow type blading geometry allows, after the blades are cast, the plastic mold to be withdrawn axially out from the blades. The blades of the turbine wheel are preferably made of high strength thermoplastic material, Vespell, a high temperature plastic made by DuPont, which is shrunk into the steel portion of the wheel which together form an integral metal/plastic turbine wheel and blade.

Turbine Parts and Its Operation

Turbine discharge housing 22 is solidly bolted by six bolts 29 to the turbine inlet housing 21 which is solidly bolted by a series of bolts at 35 to the commercially supplied (T04 form Turbonetics) turbocharger housing 41 as shown in FIG. 1. Turbine nozzle ring 18 preferably made from Vespel is held in a precise axial and radial position by the turbine inlet housing 21 and the turbine discharge housing 22. (Nozzle ring 18 could also be made from brass or any of several other similar metals.) Nozzle ring 18, inlet housing 21 and discharge housing 22 together define toroidal inlet cavity 32 as shown in FIG. 1. The high oil pressure contained inside inlet cavity 32 is sealed by O-Ring 24 and O-Ring 25 which prevent any leakage from inlet cavity 32 to the discharge cavity 34 along the contact surfaces between turbine nozzle ring 18, turbine inlet housing 21 and turbine discharge housing 22. A substantial portion of the inside diameter of the turbine nozzle ring 18 is supported radially by matching diameters of turbine inlet housing 21 and turbine discharge housing 22 which restrain radial deformation of the turbine nozzle body 18 and to a great degree absorb inwardly compressive pressure generated by the high pressure hydraulic fluid contained inside inlet cavity 32. The axial dimension of the turbine nozzle ring 18 is precisely matched with the axially allowable space between turbine discharge housing 22 and turbine inlet housing 21. At normal operating temperatures the turbine nozzle ring 18 expands slightly more than the matching surfaces of turbine inlet housing 21 and turbine inlet housing 22 which essentially restrain the axial expansion of the turbine nozzle ring 18 and produces a moderate axial compressive stress in the turbine nozzle ring 18. Commercially supplied sliding seal ring 16 provides the oil seal between the commercially supplied turbocharger housing 41 and the turbocharger shaft 14. O-Ring 26 seals the relatively low oil pressure around the turbocharger shaft 14 from leaking to ambient. O-Ring 23 seals the high oil pressure contained in inlet cavity 32 from leaking to ambient.

As indicated in FIGS. 3 and 4, in this embodiment sixteen turbine nozzles 15 are drilled in a radial plane, through the turbine nozzle ring 18 at an angle of 11 degrees with the tangent to a circle of the plastic turbine blades 31 outer diameter. The center lines of the turbine nozzles 15 positioned in a radial plane cause high pressure hydraulic fluid to expand radially inward from the inlet cavity 32 through turbine nozzles 15 into the vaneless passage 19 and into the inlet of the plastic turbine blades 31 where the hydraulic fluid momentum is converted into shaft power by well known principles. FIG. 3 shows the plan view of the exit portion of the turbine nozzles 15 as viewed in the planes 3—3 in FIG. 4. FIG. 4 shows a section through the nozzle ring 18 along the plane 4—4 in FIG. 3. High hydrodynamics efficiency of nozzles 15 is attributed to the particular combination of rounded cross-sectioned turbine nozzles 15 and the gradual change in the cross section of the flow area along the centerline axis of the individual turbine nozzles 15 as shown in FIG. 3. The sixteen turbine nozzles 15 are positioned close to each other within the turbine nozzle ring 18 so as to produce minimum wakes of low velocity fluid in the vaneless passage 19 and turbine blades 31. Such wakes are considered to be generally harmful to the turbine hydraulic efficiency. Such nozzle positioning as shown in FIGS. 3 and 4 maximizes the percentage of the turbine blades radial flow area occupied by the high velocity fluid relatively to the radial flow area occupied by the wakes. Also, providing vaneless passage 19 permits each of nozzles 15 to be drilled without drilling into other nozzles.

During operation high pressure oil (preferably at about 1500 psi) enters the turbine via inlet channel 27. It flows into inlet cavity 32 that supplies the oil flow to the 16 nozzle passages 15 that are contained within turbine nozzle ring 18. The oil flow accelerates through nozzle passages 15 converting pressure energy into kinetic energy which is then utilized to provide a driving force to the plastic turbine blades 31. Oil exits from the plastic turbine blades 31 into exit cavity 34 and is discharged at low pressure through exit channel 33.

Design Details—Three Models

The hydraulic turbine drive described herein will provide very substantial advantages in cost and performance, especially for high speed turbine drives in the 50,000 to 150,000 RPM and 5 to 25 horsepower ranges. I provide in the following table design details applicable to three preferred embodiments recommended for use as drives for motor vehicle superchargers.

| MODEL | 1 | 2 | 3 |
|---|---|---|---|
| Engine Power (HP) | 140 | 220 | 300 |
| Turbonetics Compressor Model | TO4B S3 | TO60-1 | TO67 |

-continued

| MODEL | 1 | 2 | 3 |
|---|---|---|---|
| Compressor Pressure Ratio | 1.52 | 1.52 | 1.52 |
| Hydraulic Turbine Power (HP) | 9.6 | 14.8 | 19.5 |
| Hydraulic Turbine Pressure (PSIG) | 930 | 1020 | 1130 |
| Hydraulic Turbine Flow (GPM) | 23.5 | 32.0 | 38.0 |
| Hydraulic Turbine Efficiency | 0.75 | 0.77 | 0.78 |
| Hydraulic Turbine Speed (RPM) | 69,750 | 64,500 | 62,500 |
| Hydraulic Turbine Wheel Dia. (mm) | 20 | 20 | 22 |
| Hydraulic Turbine Blade Height (mm) | 1.55 | 1.58 | 1.65 |
| Number of Nozzles | 8 | 8 | 12 |
| Nozzle Angle (DEG.) (measured from tangent) | 11 | 11 | 11 |
| Rotor Blade Angle (DEG.) | 28 | 28 | 28 |
| Number of Rotor Blades | 27 | 27 | 30 |

The above parameters are chosen for supercharging non-turbocharged engines. When supercharging similar size turbocharged engines the operating parameter requirements will be lowered appropriately using well known thermodynamic principals.

Alternate Turbine Arrangements

Figure 5:
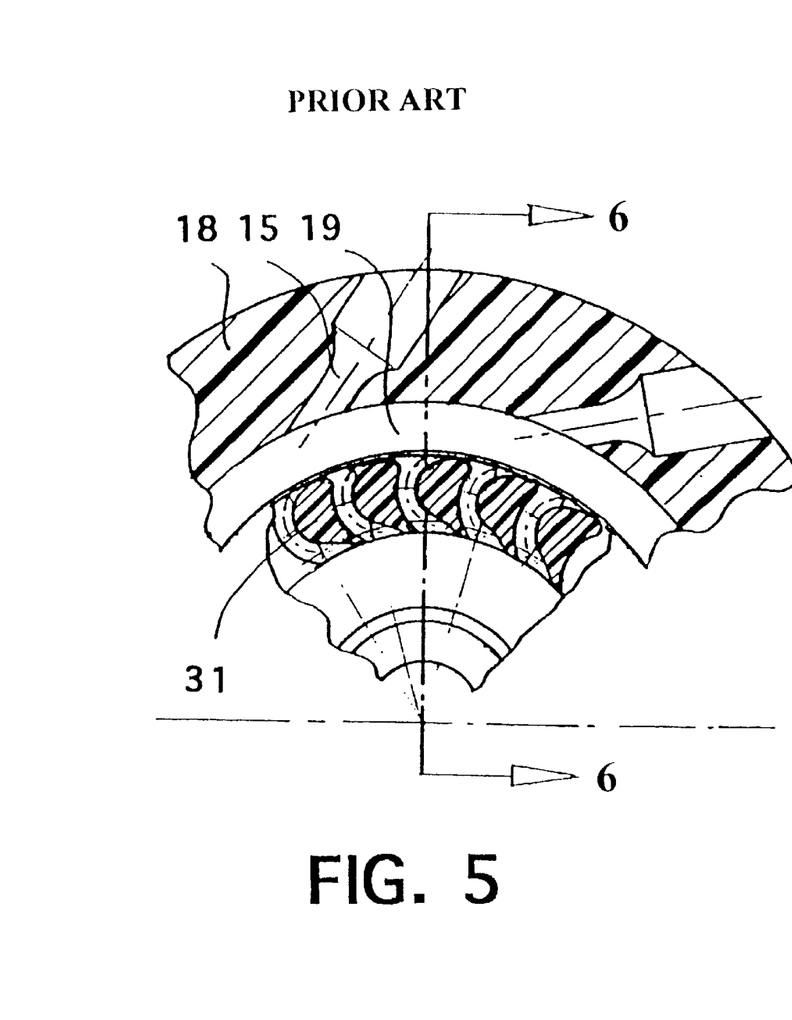
FIGS. 5 and 6 show an alternate arrangement similar to that shown in FIGS. 3 and 4.
Figure 6:
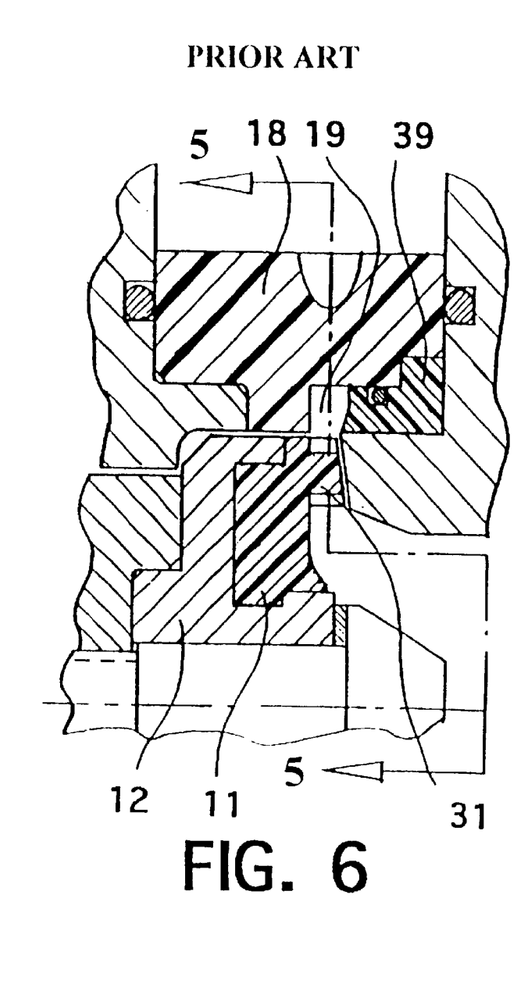

An alternate turbine arrangement is shown in FIGS. 5 and 6. This arrangement provides for better matching of the hydraulic turbine with different sizes of supercharging compressor wheels, without the necessity for changing basic turbine blades, tooling and nozzle tooling. FIG. 5 which represents section 5—5 in FIG. 6 shows the vaneless passage 19 having increased radial depth as compared to preferred embodiment shown in FIGS. 3 and 4. FIG. 6 which represents section 6—6 in FIG. 5 shows ring insert 39 forming conically slanted sidewall of vaneless passage 19, which decreases axial width of vaneless passage 19 with decreasing radius. The plastic turbine blades 31 are axially shorter, matching the width of the vaneless passage 19 at the exit of the vaneless passage 19. The change in vaneless passage 19 width affects mainly the radial velocity component of the free vortex flow that is predominant in the vaneless passage 19. Since the tangential velocity component is governed by the law of conservation of momentum, it is inversely proportional to the change in radius and is generally not affected by the change in the width of the vaneless passage 19. By changing the radial velocity component at different rate than the tangential velocity component, the angle of velocity exiting the vaneless passage 19 will change with different width of ring inserts 39 and will affect the turbine operating speed at the point of maximum turbine power, which is one of the objectives of this alternate embodiment. With decreased width of vaneless passage 19, the hydraulic fluid will expand partially through the nozzles 15 and partially through the vaneless passage 19, which will affect the turbine pressure vs flow characteristics, which is another objective of this alternative embodiment.

Figure 7:
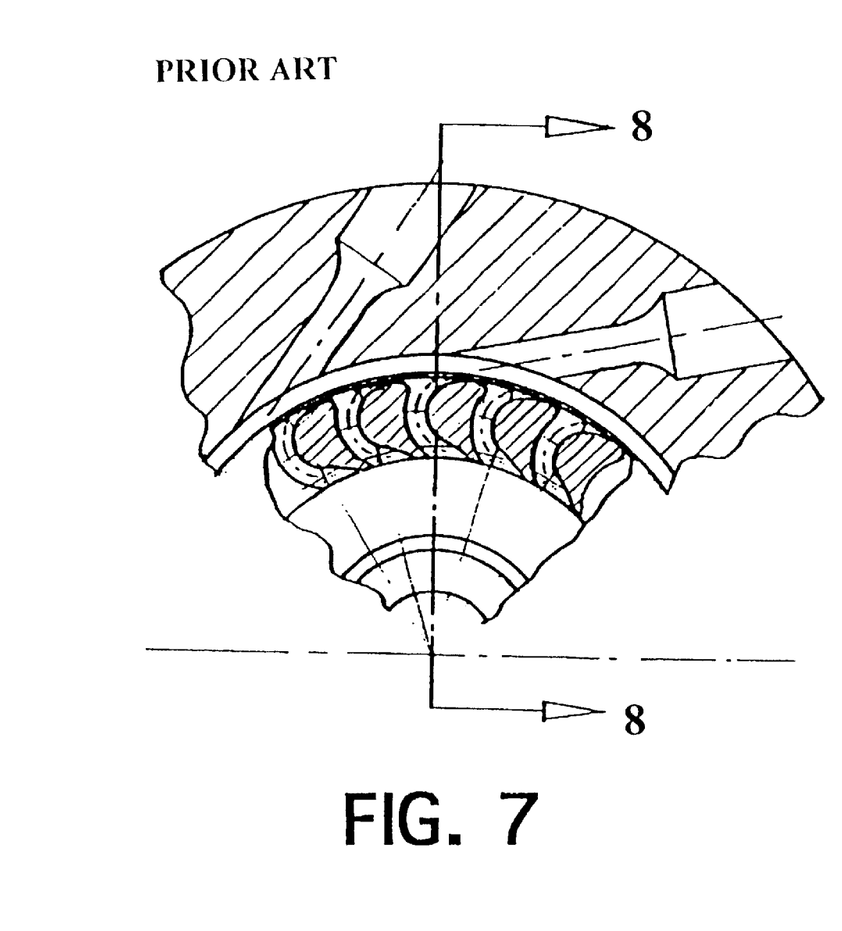
FIGS. 7 and 8 show views of an all metal turbine wheel.
Figure 8:
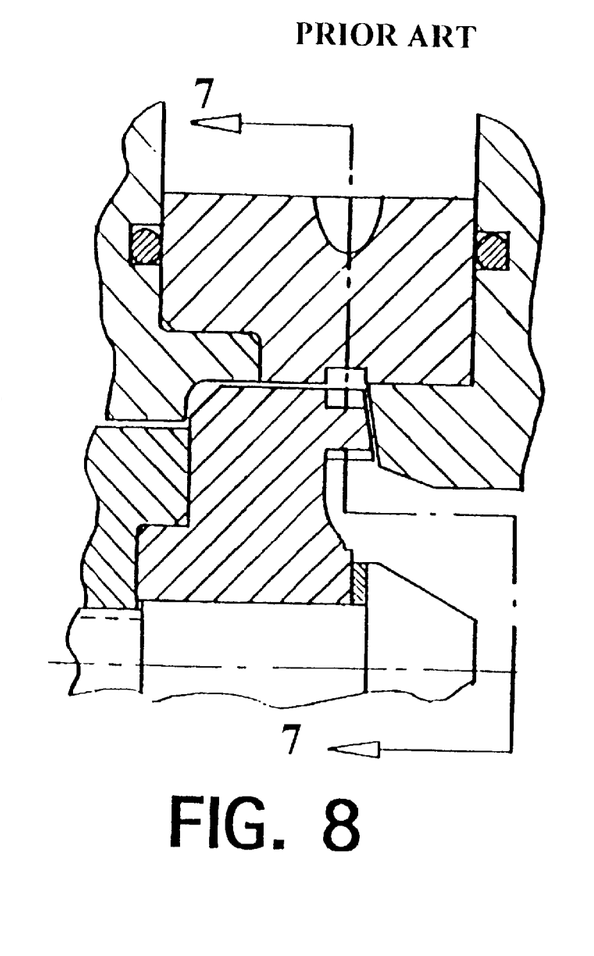

A solid metal wheel turbine is shown in FIGS. 7 and 8. My preferred metal is brass. The blades are machined. The wheel is more expensive than the metal-plastic wheel discussed above but service life could be considerably longer.

Drive for Supercharger

Figure 2:
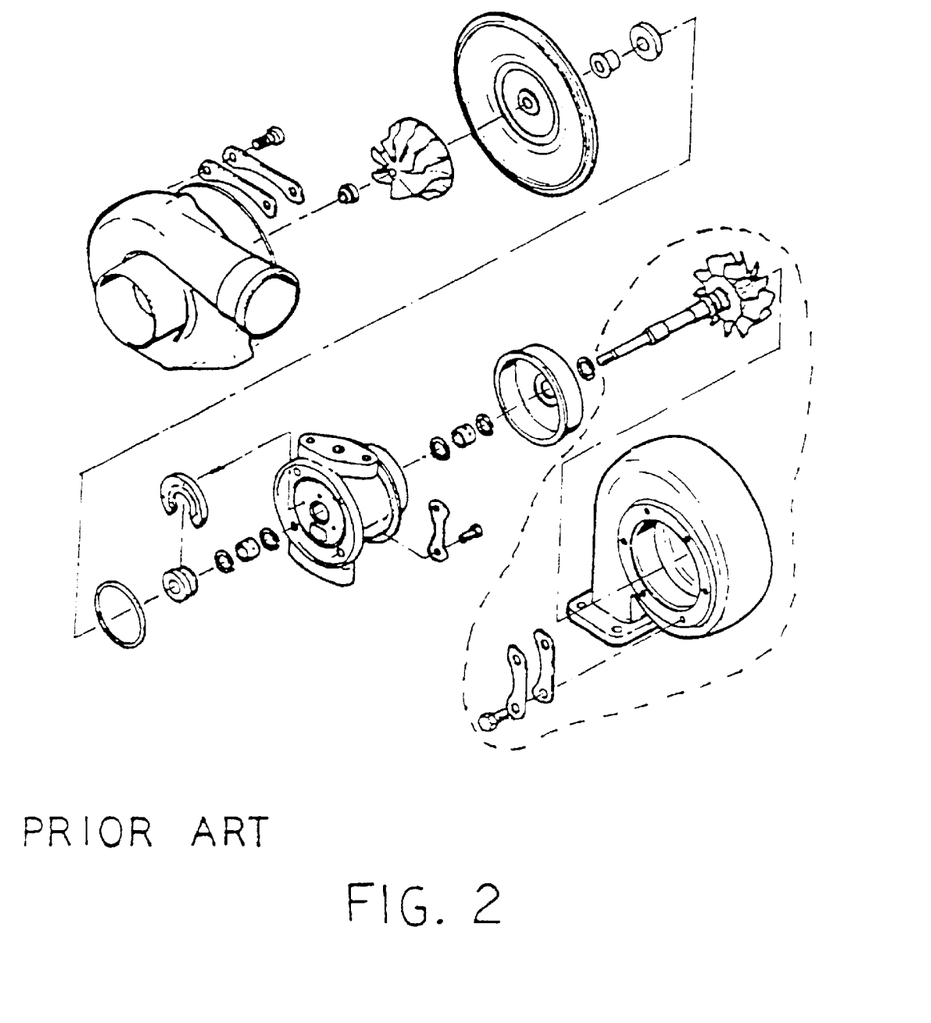
FIG. 2 is a drawing showing an exploded view of a prior art turbocharger.

The turbine described in detail herein is designed for use with the compressor and bearing assembly portion of the TO4B turbocharger, sold by Turbonetics Incorporated, 650 Flinn Avenue, Unit 6, Moorpark, Calif. A drawing of this model is shown in FIG. 2. The dashed line in FIG. 2 encircles the parts not used in a preferred embodiment of the present invention. The parts I use are individually available from the Turbonetics catalogs.

Hydraulic Supercharging System

FIG. 10 is a copy of FIG. 12 of my '695 patent as previously stated. This supercharger system utilizes a supercharger and turbocharger is series where line 89 is connected to the discharge line out of turbocharger 66. Second aftercooler 67 supplies cooled compressed air via line 75 into engine 68. Exhaust pipe 71 provides the turbine section of the turbocharger 66 with pressurized exhaust flow which after exiting turbocharger 66 turbine section flows further through line 73 to ambient or to another turbine or heat exchanger. Valve 72 provides for turbocharger 66 control to prevent overboosting engine 68.

In this system, engine 68 is an internal combustion engine. Hydraulic pump 81 is driven by engine 68 and the pump is pressurizing, at the rate of about 27 gallons per minute, hydraulic fluid to a pressure of approximately 1000 psi into line 82 which channels the hydraulic fluid to turbine drive 8 and via line 84 to bypass valve 83. Hydraulic pump 81 is a commercially available hydraulic pump such as Parker Model H77. Supercharger compressor wheel 62 is a standard commercially available TO-4 compressor which is driven by turbine wheel 61 as shown in FIG. 10.

Bypass valve 83 when open allows hydraulic fluid to bypass turbine 61 and unloads hydraulic pump 81. To prevent unnecessary wear and friction losses of pump 81, when the high-pressure hydraulic fluid is not needed, it is desirable to mechanically disconnect pump 81 from engine 68. This is accomplished with a clutch (not shown). Such clutch is commonly used in driving hydraulic pumps and is commercially available from suppliers such as Northern Hydraulic Co. with offices in Burnsville Minn. In order to increase the useful life of the clutch, it is desirable to connect and disconnect the pump under minimum pump load whenever possible. For this reason, a controller (not shown) preferably causes bypass valve 83 to open a fraction of a second before the clutch disengages pump 81. Also, the controller causes bypass valve to close a fraction of a second after the clutch engages. These precautions minimize wear on the clutch.

Turbine discharge line 94 is connected to bypass valve discharge line 85. The amount of flow from turbine wheel 61 discharge is reduced by the bearing lubricant flow of approximately 1.5 GPM which flows through line 86. The combined flow from the bypass valve 83 discharge and turbine wheel 61 net discharge flow are forced to flow through throat 92 of venturi nozzle 93. Throat 92 diameter is sized to provide a drop in static pressure at the throat 92 location of about 60 psi. This location serves as the return point for the lubricant flow supplied to supercharger bearings via line 86. The bearings drain line 87 is connected to expansion tank 88, which provides for thermal expansion of the hydraulic fluid and as a degassing point for the hydraulic fluid. The expansion tank is further connected via line 91 to the throat of venturi 93. Bearing lubricant flow from line 91 joins at that point the combined turbine discharge and bypass valve discharge flows, flowing further through the diffuser section of venturi nozzle 93 where about 80 percent of the throat 92 dynamic head of 60 psi is recovered, thus raising the static pressure in line 96 to about 50 psi above throat of venturi 93 static pressure.

The hydraulic fluid flows from line 96 into oil cooler 97 where the heat losses are rejected. Hydraulic fluid flows further via line 98 back into hydraulic pump 81. Pressurized air flowing through line 64 is typically aftercooled in the air to air aftercooler 65 where large amount of heat of compression is rejected to ambient. Relatively cool pressurized air is further charged into engine 68. Line 71 is the engine exhaust pipe. Bearing oil discharge is directed to expansion tank 88. Expansion tank 88 is vented into supercharger discharge line 64 that pressurizes expansion tank 88 to supercharger discharge line pressure.

A very important advantage of the hydraulic supercharger over direct drive superchargers is that the supercharger compressed air flow and pressure in the present system can be controlled independent of engine speed. This is simply done by adjusting the bypass flow through valve 83 and by disconnecting the pump from the engine shaft with the clutch. This permits much higher power at low speeds for motor vehicles and permits easy compensation for altitude changes in airplane engines.

Engine Exhaust Turbine

Engine exhaust turbine 66 is a standard turbocharger turbine such as the turbine portion of the TO4B-V turbocharger. It is driven as stated above by engine exhaust from engine 68 through exhaust pipe 71 and the exhaust from the turbine is to the ambient.

Supercharger Compressor

Compressor 62 is a standard turbocharger compressor again such as the compressor portion of the TO4B-V turbocharger. The exhaust from compressor 62 is directed through line 64, air to air aftercooler 65, and line 70 into the intake manifold of engine 68.

Exhaust Power Recovery

FIG. 11 shows important features of the present invention providing waste exhaust energy recovery at high engine speed. At high engine power levels, exhaust gas out of engine 68 flows into gas turbine 111 and via line 71 into turbocharger turbine 130 and exhausts to the atmosphere via line 73. In the case of reduced engine power and reduced hydraulic supercharging, the gas bypass valve 131 which is commonly controlled by the engine computer (not shown) is either partially or fully open and allows exhaust gasses to flow via lines 131 and 71 into turbocharger turbine 130. In this preferred embodiment gas turbine 111 has a 5.24-inch diameter turbine wheel operating at 32,000 rpm and producing 42 shaft horsepower with 1200 degree F. inlet temperature and pressure ratio of 1.70. Gas turbine 111 is driving power-generating pump 115 through a reduction gear box 114 with gear ratio of 8 to 1. The gas turbine has an efficiency of about 80 percent. Power generation pump 115 is a 22 gpm/3000 psi/4000 rpm gear pump available commercially from many suppliers such as Sundstrand, J S Barnes, Parker, Haldex, etc. Power generating pump 115 and hydraulic motor 118 are commercially available with 90 percent hydraulic efficiency; therefore, the combined exhaust power recovery system efficiency is about 65 percent at full engine power. High pressure hydraulic fluid flows via line 117 into hydraulic motor 118 which transmits the power via shaft 136 into pump 81 and into engine 68. Hydraulic motor 118 is available commercially from most pump suppliers such as the companies listed above. Motor 118 is mounted co-axially with pump 81. Alternately, it can be shaft connected to other auxiliary drive shafts that may be available on the particular engine to which this invention is applied. Discharge out of hydraulic motor 118 flows via line 119 and line 120 into line 96 where it joins the hydraulic flow from venturi 93. Flows from line 120 and line 96 flow via line 138 into oil cooler 97 where the excess heat is removed. Flow out of the oil cooler 97 flows via line 139 and splits into line 98 which returns the hydraulic supercharger oil flow into pump 81 and flow through line 116 into power generating pump 115. Line 121 allows flow from motor 118 and line 119 to recirculate back into line 124 via check valve 122 and line 123.

Since gas turbine 111 can be fully unloaded and idling under certain low operating conditions, the hydraulic flow out of power generating pump 115 can decrease independently of the flow capacity of hydraulic motor 118 which drives engine 68 or is being driven by engine 68. When flow out of power generating pump 115 becomes less than flow capacity of hydraulic motor 118, motor 118 becomes a hydraulic pump and the excess hydraulic flow recirculates freely around hydraulic motor 118 via line 121 check valve 122 and line 123.

At high engine loads gas bypass valve 131 closes and gas turbine 111 starts to produce power. Power generating pump 115 pressurizes hydraulic motor 118 and check valve 122 closes forcing the entire hydraulic flow via line 124 into hydraulic motor 118. At this point speed and flow out of the power-generating pump 115 are dictated by the flow capacity of hydraulic motor 118 dictated in turn by the speed of engine 68. Gas turbine 111 operating condition adjusts to match torque and speed of power generating pump 115. Thus, check valve 112 functions as a very inexpensive and highly durable "hydraulic ratchet gear" that allows for smooth transition of power transfer from power generating pump 115 to hydraulic motor.

The above energy recovery system, when applied to a 280 horsepower turbocharged diesel engine with hydraulic superchargering as described above, recovers about 40 horsepower from the exhaust gas reducing its temperature from about 950 degrees F. to about 800 degrees F. Thus, more than enough energy is recovered from the exhaust gasses by the exhaust power recovery system to operate the hydraulic supercharger system. The horsepower of the 280 horsepower turbocharged diesel engine is increased by about 20 percent (at sea level) to about 335 horsepower. As to fuel efficiency, Applicant estimates that a cross country diesel truck operating 12 hours per day, 300 days per year will save between 6,000 and 10,000 pounds of fuel per year with substantial reductions in emitted pollutants. At 10,000 feet the horsepower is increased by about 30 percent.

Exhaust Recovery Assembly

Figure 12:
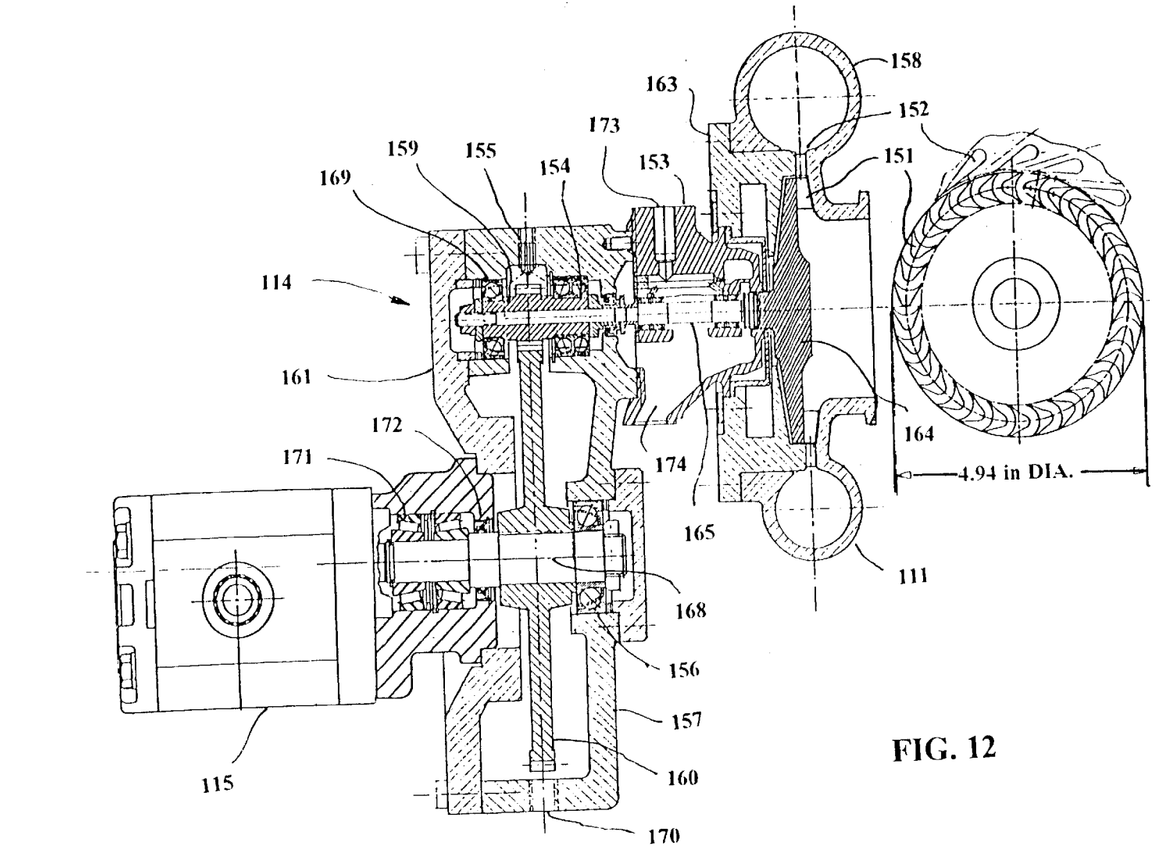
FIG. 12 is a cross section drawing showing important features of the FIG. 11 preferred embodiment.

FIG. 12 is a cross section drawing of a preferred exhaust power recovery assembly. It comprises gas turbine 111, reduction gear box 114 and power generating pump 115. Gas turbine 111 is a radial inflow turbine comprising 32 turbine blades 151 solidly attached to turbine wheel 164 and 16 stator vanes 152 solidly attached to back plate 163. High-pressure gas enters volute housing 158, expands through passages formed by stator vanes 152 and transits the gas kinetic energy to turbine blades 151. In this preferred embodiment approximately 80 percent of the gas energy is expanded through stator vanes 152 and about 20 percent through turbine blades 151 producing gas turbine thermal efficiencies of about 80 percent. Turbine wheel 164 produces up to 42 shaft horsepower at 32,000 rpm. High-speed shaft 165 is solidly attached to turbine wheel 164 and pinion gear 159 which drives low speed gear 160 with a gear ratio of 8 to 1. Low speed gear 160 is solidly attached to low speed shaft 168 which drives power generation pump 115 which is commercially available from Sundstrand (Model SNP2 gear pump). Similar pumps are available from several other suppliers. High speed shaft 165 is supported by bearing housing 153 which is commercially available from several suppliers such as model TO4B from Turbonetics, Inc with offices in Simi Valley, Calif. Pinion gear is supported by ball bearing 154 and ball bearing 169. Low speed shaft is supported by ball bearing 156 and conical roller bearing 171 which is supplied as part of power generating pump 115.

Lubrication to pinion gear 159, low speed gear 160, ball bearing 154,169 and 156 is provided via oil jet nozzle 155. Lubrication of bearing housing 53 is provided via oil inlet 173. Oil drain out of bearing housing 153 is provided via inlet 173. Oil drain out of bearing housing 153 is provided via drain channel 174. Oil drain out of reduction gear-box 114 is provided via drain channel 170. In this embodiment these oil supply and drain functions may be supplied using methods commonly used for commercial turbochargers by the engine oil supply pump. This energy recovery system is especially effective at high altitudes where the two-stage, turbocharger, supercharger compression provides the high density air needed to provide high engine power.

Alternate Exhaust Power Recovery Turbine Location

Figure 13:
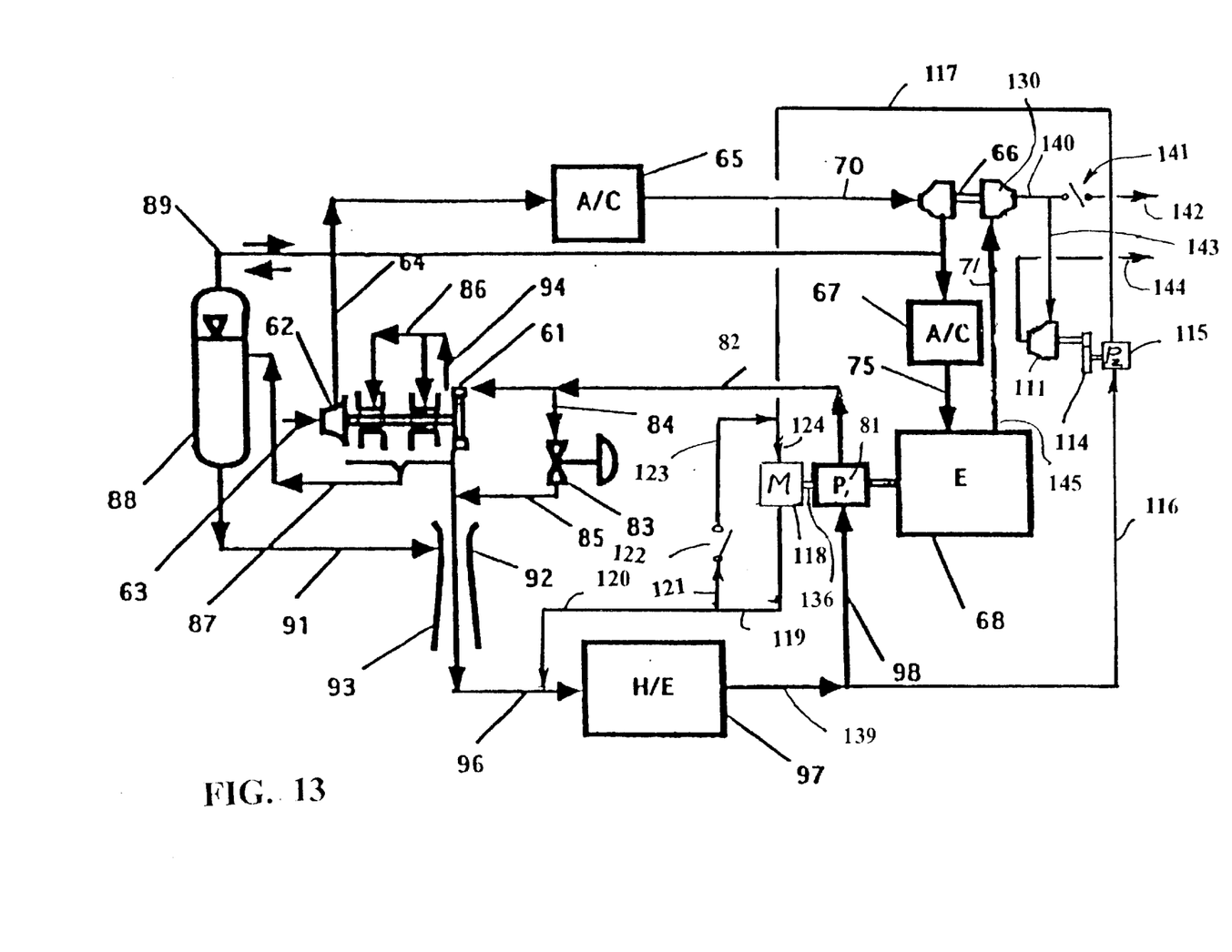
FIG. 13 is a layout of a second preferred embodiment of the present invention.

FIG. 13 shows an alternate location of gas turbine 111 in which gas turbine 111 is in series with turbocharger turbine 130 but located down stream of turbine 130. Gas exhausting from turbocharger turbine 130 is channeled via gas line 140 and gas line 143 at pressures generally higher than atmospheric to gas turbine 111 and after expanding through turbine 111 passes via line 114 to atmosphere.

At high engine loads gas control valve 141 is closed forcing gas flow out of turbocharger 130 to flow through turbine 11 providing substantial power to power generating pump 115. At low engine loads when energy content of the exhaust gasses is generally low, gas control valve 151 is fully open and exhaust out of the turbocharger turbine 130 flows relatively unrestricted into the atmosphere via line 142.

Power output sum of turbocharger turbine 130 and gas turbine 111 remains essentially the same as in the FIG. 12 embodiment. Other considerations such as turbine size, rotating speed and location of each respective turbine of engine 68 can influence choices between these two embodiments.

It should be understood that the specific form of the invention illustrated and described herein is intended to be representative only, as certain changes may be made therein without departing from the clear teachings of the disclosure. Accordingly, reference should be made to the following appended claims in determining the full scope of the invention.

I claim:

1. An exhaust power recovery system for an internal combustion engine, having an engine shaft, said exhaust power recovery system comprising:
    A) a hydraulic fluid system comprising a hydraulic fluid circulating in said hydraulic fluid system,
    B) a turbocharger configured to turbocharge said engine, said turbocharger comprising a first gas turbine driven by exhaust gas from said engine and a turbocharger compressor driven by said first gas turbine,
    C) a hydraulic turbine driven supercharger system comprising a first hydraulic fluid pump driven by said engine shaft for pressurizing a first portion of said hydraulic fluid, a high speed hydraulic turbine driven by said first hydraulic fluid pump and a supercharger compressor driven by said high speed hydraulic turbine, said supercharger system being configured to supercharge said engine,
    D) a second gas turbine driven by exhaust gas from said engine,
    E) a second hydraulic pump for pressurizing a second portion of said hydraulic fluid, said second hydraulic pump being driven through a gear box by said second gas turbine,
    F) a hydraulic motor driven by said second hydraulic fluid pump, said hydraulic motor being configured to transmit power to said engine shaft.

2. The system as in claim 1 wherein said exhaust energy recovery system is configured so that compressed air discharged out of said supercharger system provides input air flow to said turbocharger compressor.

3. The system as in claim 1 where said second gas turbine is configured to operate at speeds of about 32,000 rpm or greater.

4. A system as in claim 1 wherein said supercharger system further comprises a supercharger controlled bypass means comprising a controlled bypass valve and a piping means to permit a portion of said hydraulic fluid flow from said first pump or said second pump or said first pump and said second pump to bypass said supercharger turbine drive as directed by said flow controller.

5. A system as in claim 4 wherein said controlled bypass valve is an electo-proportionally controlled valve.

6. A system as in claim 1 wherein said supercharger system comprises:
    (A) a supercharger comprising:
        (1) a shaft defining a shaft axis and supported by supercharger bearings,
        (2) a high speed hydraulic radial inflow turbine drive comprising:
            (a) a turbine nozzle body defining a turbine nozzle body outlet surface and comprising a hydraulic fluid cavity and a plurality of nozzles each of said nozzles providing a passageway for hydraulic fluid to pass inwardly from said hydraulic fluid cavity to said outlet surface and defining a nozzle centerline, where each of said nozzle centerlines:
                (i) intersects said turbine body outlet surface at a point of intersection on a circle is concentric about said shaft axis and defines a nozzle exit circle and
                (ii) forms an angle of about 8 to 30 degrees with a tangent to said nozzle exit circle at said point of intersection,
            (b) a radial in-flow hydraulic turbine wheel assemble comprising a plurality of radial flow turbine blades on a blade circle having a diameter of less than 2 inches; said turbine wheel assembly being arranged in relation to said shaft and said turbine body outlet surface such that hydraulic fluid discharged from said nozzles impinge on said blades to cause rotation of said turbine wheel and said shaft,
        (3) a compressor driven by said hydraulic turbine drive,
    (B) a flow controller,
    (C) a first hydraulic pump driven by said engine shaft supplying hydraulic fluid of a hydraulic fluid system to said supercharger and a first hydraulic pump controlled bypass system to permit output flow or said first hydraulic pump to bypass said supercharger upon direction of said flow controller,
    (D) a hydraulic venturi unit defining a main inlet, an outlet and a low-pressure throat section,
    (E) an expansion tank, (F) a main hydraulic piping means providing a hydraulic circulation loop for hydraulic fluid to flow from said first and second pumps, to drive said hydraulic turbine drive, to said main inlet of said venturi unit, through said venturi unit, to said venturi outlet and back to said pump, and (G) a lubrication piping means providing a lubrication route for a portion of said hydraulic fluid flow from said turbine drive to said bearings to said expansion tank and to said low pressure throat section of said venturi unit.

7. A system as in claim 1 and further comprising a digital processor.

8. A system as in claim 1 and further comprising an oil cooler located within said hydraulic circulation loop.

* * * * *